Figure 1:
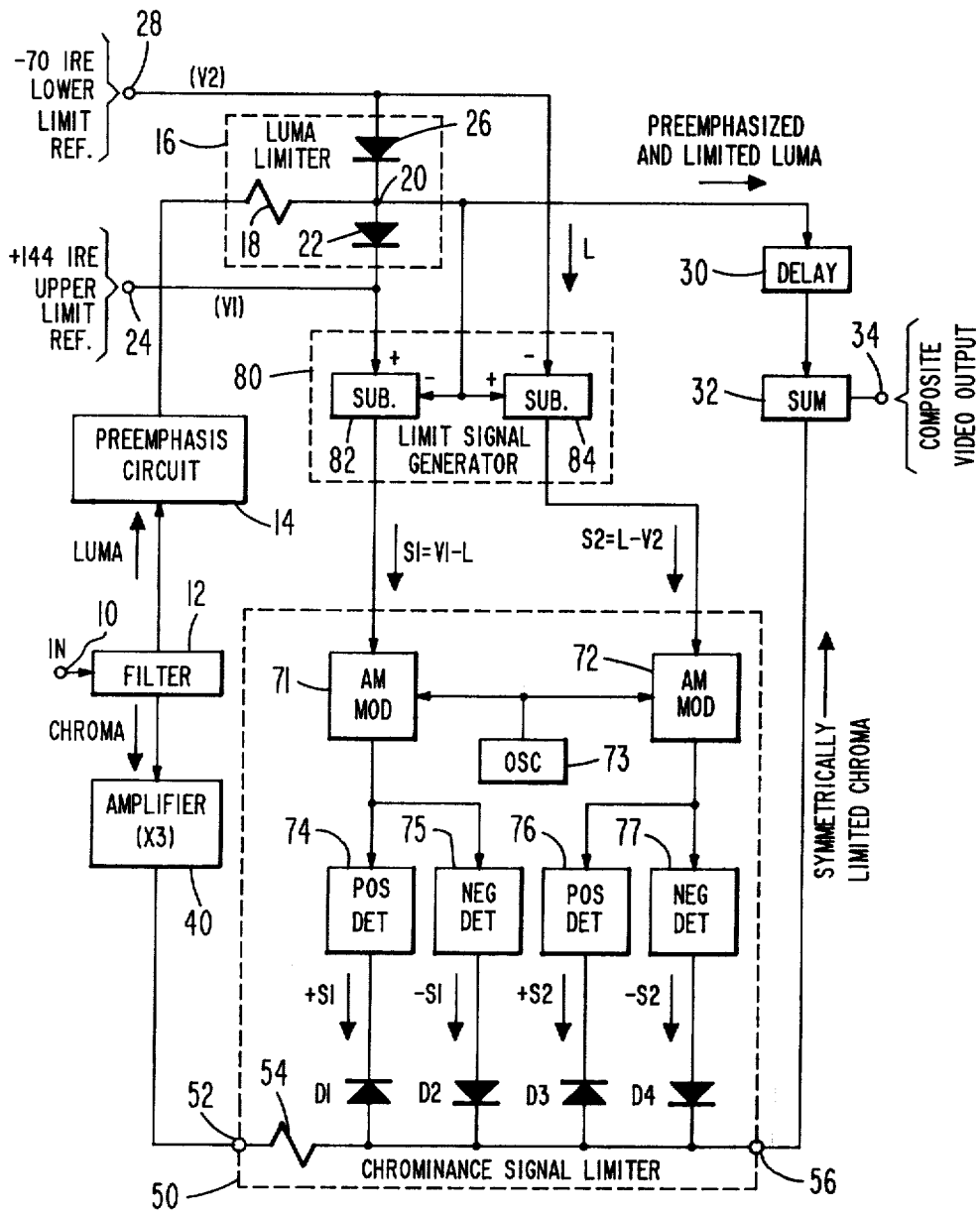

United States Patent [19]

Schwarz

[11] 4,384,302
[45] May 17, 1983

[54] COMPOSITE VIDEO SIGNAL LIMITER

[75] Inventor: Hans G. Schwarz, Pennington, N.J.

[73] Assignee: RCA Corporation, New York, N.Y.

[21] Appl. No.: 278,449

[22] Filed: Jun. 29, 1981

[51] Int. Cl.³ .................. H04N 9/493; H04N 9/535
[52] U.S. Cl. .................................. 358/27; 358/40; 358/316; 358/318
[58] Field of Search ............. 358/315, 316, 317, 318, 358/329, 21 R, 11, 27, 31, 37, 40

[56] References Cited

U.S. PATENT DOCUMENTS

| | | | |
|---|---|---|---|
| 3,872,498 | 5/1975 | Pritchard | 358/329 |
| 3,934,263 | 1/1976 | Palmer | 358/315 |
| 3,966,010 | 12/1976 | Kawamoto | 358/329 |
| 4,005,474 | 1/1977 | Keizer | 358/4 |
| 4,022,968 | 5/1977 | Keizer | 358/128 |
| 4,316,213 | 2/1982 | Wharton et al. | 358/11 |

Primary Examiner—Michael A. Masinick

Attorney, Agent, or Firm—E. M. Whitacre; J. S. Tripoli; R. G. Coalter

[57] ABSTRACT

A filter separates a composite video input signal into luminance and chrominance signal components. The luminance signal component is limited to a range of values defined by first and second reference signals. Excursions in either sense of the chrominance signal component are limited to the lesser of two control signals, one control signal being proportional to a potential difference between the limited luminance signal and the first reference signal, the other control signal being proportional to a potential difference between the limited luminance signal and the second reference signal. The limited luminance and limited chrominance signals are combined to provide a composite video output signal limited to the range defined by the reference signals and in which the chrominance component thereof is symmetrically limited with respect to the luminance component thereof, thereby reducing distortion of the chrominance component of the composite output signal under limiting conditions.

8 Claims, 5 Drawing Figures

COMPOSITE VIDEO SIGNAL LIMITER

This invention relates to video signal processing apparatus and particularly to apparatus for limiting amplitude excursions of a composite video signal.

In certain color picture information processing systems, it is advantageous to employ FM techniques in the transmission of video information. See, for example, U.S. Pat. Nos. 3,934,263; 4,022,968; and 4,005,474, which disclose video disc recording arrangements in which a recording signal is formed which includes a picture carrier wave modulated in frequency in accordance with the amplitude of a composite color video signal inclusive of luminance and chrominance signal components.

In such video disc (or tape) recording systems, bandwidth limitations of the recording media can limit the modulation index for the higher frequency components of the video signal to such an extent that a signal-to-noise ratio reduction may occur for signal frequency components near the higher end of the modulating signal band. For this reason, it is conventional practice in disc and tape recording systems to translate the chrominance signal from its normal location at the upper end of the luminance band to a lower frequency so that the signal-to-noise ratio loss of the chrominance component does not become excessive. Pritchard, in U.S. Pat. No. 3,872,498, discloses translating systems which interleave or "bury" the chrominance signal within the midband portion of the luminance signal band. This technique is commonly referred to as "buried subcarrier" (BSC) encoding and prevents degradation of the chrominance signal-to-noise ratio for at least the reasons mentioned above.

While the chrominance signal-to-noise ratio may be improved by means of buried subcarrier encoding, a different approach is used to overcome the loss which may occur for higher frequency luminance signal components. Conventionally, the luminance signal is subjected to high frequency preemphasis prior to modulation of the FM carrier so that a signal-to-noise ratio improvement may be realized when a complementary high frequency deemphasis is imparted to the luminance component of the FM carrier (e.g., in a disc or tape player). To prevent the preemphasized luminance signal from causing excessive carrier deviation of the frequency modulator, some form of video signal limiting is needed. In a known method of composite video signal limiting, the luminance signal is clipped at predetermined levels and summed with the chrominance signal to form a composite signal which is then clipped and applied to the modulator.

It has been found that when a composite video signal is limited by clipping its peaks at fixed levels and used, for example, to drive the cutterhead of a video disc mastering lathe, certain undesirable effects may be observable in a picture produced when the mastering substrate or a pressed disc is played back and displayed on a television receiver or monitor. In particular, it has been found that for certain program material, the chrominance content of the picture may tend to undesirably influence the picture luminance level and flesh tones may tend to exhibit an unnatural hue.

A substantial reduction in chrominance-luminance signal interference and hue shifts may be realized by controllably compressing the chrominance signal in the manner proposed by Wharton et al. in their U.S. Pat. No. 4,316,213 entitled "Video Signal Processing Apparatus", which was filed Sept. 23, 1980. In the Wharton et al. apparatus, the chrominance component of a composite video signal is compressed in response to peaks in excess of a given value of a control signal. The control signal is derived from a selected one of (1) the chrominance component of the composite video input signal, (2) a sum of the chrominance component of the composite video input signal and the preemphasized luminance signal and (3) the output composite video signal produced by the apparatus.

The technique of controlled chrominance signal compression of Wharton et al. provides a desirable reduction of even order harmonic distortion of the chrominance signal. This is particularly advantageous where the video signal is of the buried subcarrier format proposed by Pritchard and in which the chrominance signal subcarrier choice is such that its second harmonic falls within the luminance signal band. A visual effect of the presence of the undesired second harmonic of the chrominance signal in the luminance signal band is the formation of picture anomalies such as vertical bars or variations of brightness with the level of color saturation.

Notwithstanding the advantage of the controlled chrominance signal compression technique proposed by Wharton et al., a need exists in video signal limiting apparatus for further reduction in even order harmonic distortion of the chrominance component of a composite video signal. A need also exists for simplified and precise control of the peak amplitude limits of the processed composite video signal. The present invention is directed to meeting these needs.

Video signal processing apparatus in accordance with the present invention includes filter means for separating a composite video input signal into two components comprising a luminance signal and a chrominance signal. A first limiter means limits the luminance signal to a range of values defined by first and second reference signals to provide a limited luminance signal. A circuit means provides a first control signal proportional to a potential difference between the limited luminance signal and the first reference signal and provides a second control signal proportional to a potential difference between the limited luminance signal and the second reference signal. A second limiter means symmetrically limits excursions in either sense of the chrominance signal to the lesser of the control signals. The limited luminance and limited chrominance signals are combined to provide a composite video output signal limited to a range defined by the reference signals and in which the chrominance component thereof exhibits symmetry with respect to the level of the luminance component thereof.

In the drawings:

FIG. 1 is a block diagram, partially in schematic form, of a composite video signal limiter embodying the invention; and FIGS. 2–5 are waveform diagrams illustrating operation of the composite video signal limiter of FIG. 1.

The apparatus of FIG. 1 is useful in applications where it is desired to confine amplitude excursions of a baseband color video signal to a predetermined range of values and where, under limiting conditions, minimizing of color distortion is desired. Such applications include baseband transmission systems (e.g., closed circuit video monitoring) as well as carrier transmission systems (e.g., AM broadcast TV transmitters, FM video disc or tape recorders, etc.) in which it is desired that the signal supplied to the FM or AM carrier wave modulator be limited to prevent excessive deviation or overmodulation. As will be explained, the chrominance component of the composite video signal is controlled in such a manner that it exhibits symmetry with respect to the luminance signal component under limiting conditions and the composite video output signal is confined to predictable and independently controllable limits.

The composite video signal limiter comprises an input terminal 10 for receiving a composite video input signal inclusive of a luminance signal component and a chrominance signal component. Terminal 10 is connected to the input of a filter 12 which separates the composite signal into its luminance (Luma) and chrominance (Chroma) signal components. Illustratively, filter 12 may comprise the combination of a low pass filter (for Luma) and a high pass filter (for Chroma), such filters being well known. Preferably, however, filter 12 is of the comb filter type to provide maximum filtering efficiency (i.e., signal separation). Comb filters for separating luminance and chrominance signals are well known. See, generally, U.S. Pat. No. 3,872,498 of Pritchard and U.S. Pat. No. 3,966,010 of Kawamoto which disclose high performance comb filters suitable for use in video disc apparatus.

The luminance signal produced by filter 12 is supplied via a path including a preemphasis circuit 14, a luminance signal limiter 16 and a delay element 30 to a first input of a two input summing circuit 32.

The function of preemphasis circuit 14 is to enhance the higher frequency components of the luminance signal so that a signal-to-noise ratio improvement may be realized when, for example, the signal is later recovered from a video disc record and subjected to complementary deemphasis. Illustratively, for video disc mastering, circuit 14 may comprise a resistance-capacitance or a resistance-inductance type of lead-lag network with element values selected to provide a lead break point at 0.25 MHz, a lag break point of 1.0 MHz and a slope of 6 dB/octave to provide a net boost of 12 dB to the higher frequency luminance signal components.

Limiter 16 (outlined in phantom) limits the amplitude of the preemphasized luminance signal to a range defined by reference voltages V1 and V2 which correspond to the desired upper and lower limits of the composite video output signal of the apparatus of FIG. 1. Illustratively, it will be assumed that V1 corresponds to a level of +144 IRE units and that V2 corresponds to a level of −70 IRE units. Limiter 16 comprises a current limiting resistor 18 coupled between the output of preemphasis circuit 14 and a circuit node 20 which, in turn, is connected via a first diode 22 to an input terminal 24 for receiving the voltage V1 and via a second diode 26 to an input terminal 28 for receiving the voltage V2. The diodes 22 and 26 are poled in a sense such that the diode 22 becomes conductive if the preemphasized luminance signal should be more positive than V1 (plus the diode threshold voltage) and diode 26 becomes conductive if the preemphasized luminance signal should be more negative than V2 (minus the diode threshold voltage). In this way, the preemphasized and limited luminance signal produced at node 20 is confined to a range of values defined by the voltages V1 and V2 (plus two diode threshold voltages). One may, if desired, replace the illustrated "passive" shunt diode limiter with the well known "active" or feedback form of limiter in which feedback techniques are used to minimize the effects of the diode threshold voltages. See, generally, the textbook "Operational Amplifiers" by Tobey et al., published in 1971 by McGraw-Hill Company, particularly Chapter 7 for examples of feedback limiter circuits.

Delay element 30 compensates for delay differences in the luminance and chrominance signal processing paths of the composite video signal limiter to prevent misregistration of the luminance and chrominance components of the processed composite video output signal. Delay differences exist mainly because of differences in bandwidth of the luminance and chrominance channels with the luminance channel having the wider bandwidth (e.g., 3-4 MHz or so) and the chrominance channel having the narrower bandwidth (e.g., about 1 MHz).

The chrominance signal produced by filter 12 is supplied via a path including an amplifier 40 and a chrominance signal limiter 50 to a second input of summing circuit 32 which combines the preemphasized and limited luminance signal with the amplified and limited chrominance signal to provide a resultant composite video output signal at output terminal 34. Amplifier 40 amplifies the non-limited chrominance signal relative to the luminance signal which is desirable for improving the chrominance signal-to-noise ratio in video disc or tape recording systems and, illustratively, may have a gain of about three.

Chrominance signal limiter 50 (outlined in phantom) is of a type which limits excursions in either sense (i.e., positive or negative peaks) of the amplified chrominance signal produced by amplifier 40 to the smaller of two control signals S1 and S2 produced, as will be explained, by a control signal generator 80 to provide a symmetrically limited chrominance output signal to summing circuit 32.

Limiter 50 comprises a pair of amplitude modulators 71 and 72 which modulate high frequency carrier waves (e.g., 20 MHz or so) with the control signals S1 and S2, respectively. The carrier waves are supplied to the modulators by means of an oscillator 73. The output signal of modulator 71 is demodulated by positive and negative demodulators or detectors 74 and 75, respectively, to recover the first control signal +S1 and its inverse −S1. Similarly, the output of modulator 72 is demodulated by a second pair of positive and negative detectors 76 and 77 to recover the second control signal +S2 and its inverse −S2.

One function of the modulator-demodulator portion of limiter 50 is to generate the complements −S1 and −S2 of the control signals S1 and S2. Since the input control signals S1 and S2 are processed in the same manner (i.e., modulated and detected) as the complementary control signals −S1 and −S2, it is thereby assured that each of the four detected signals experience substantially the same time delay.

Another function of the modulator-demodulator portion of limiter 50 is to effectively remove the DC components of the input control signals S1 and S2 and reestablish the DC components of the four limit control signals +S1, −S1, +S2, and −S2 at a value equal to the average value of the chrominance input signal applied to terminal 52 of limiter 50. As an example, if the chrominance input signal has an average value of zero IRE units, then by connecting the low pass filter portion (not shown) of detectors 74-77 to a voltage source (e.g., ground) equivalent to a level of zero IRE units, the four limit signals will all exhibit symmetry with respect to the average value of the chrominance signal regardless of what the DC component of the two input control signals S1 and S2 may be.

The remainder of limiter 50 comprises four limiter diodes D1-D4 and a current limiting resistor 54. Resistor 54 is connected between the input 52 and output 56 terminals of the limiter. Detectors 74-77 are coupled to terminal 56 via respective limiter diodes D1-D4 poled in a sense such that the less positive of the control signals +S1 and +S2 will limit positive excursions of the chrominance output signal and the less negative of the control signals −S1 and −S2 will limit negative excursions of the chrominance output signal.

The control signals S1 and S2 for limiter 50 are produced by a limit signal generator 80 which includes a subtractor 82 for subtracting the preemphasized and limited luminance signal L from the upper limit reference voltage V1 (assumed to correspond to +144 IRE units) to produce the control signal S1. A second subtractor 84 in generator 80 subtracts the lower limit reference voltage V2 from the preemphasized and limited luminance signal, L, to provide the second control signal S2 to limiter 50.

FIGS. 2-5 provide a detailed illustration of the overall operation of the composite video signal limiter of FIG. 1 under the assumed conditions that: (1) the gain of amplifier 40 is times three (X3); (2) the composite video input signal supplied to terminal 10 is an NTSC color bar pattern of moderately high brightness level (75% Luma) and of moderately high color saturation level (75% Chroma); and (3) the desired upper and lower levels of the composite video output signal are +144 and −70 IRE units, respectively. The assumed values of amplifier gain and video signal limits have been found advantageous in video disc mastering applications but other gain and limiting conditions may be preferable in other applications.

The composite video input signal choice is arbitrary but serves to illustrate relatively typical signal levels of color television program material (full levels of brightness and saturation occur relatively infrequently in typical program material). The specific choice of 75% brightness and color saturation is also convenient in that it is a standard test signal format available on conventional color bar generators. As to alignment, the reference voltages V1 and V2 are adjusted to values corresponding to the desired output signal limits of +144 and −70 IRE units.

Figure 2:
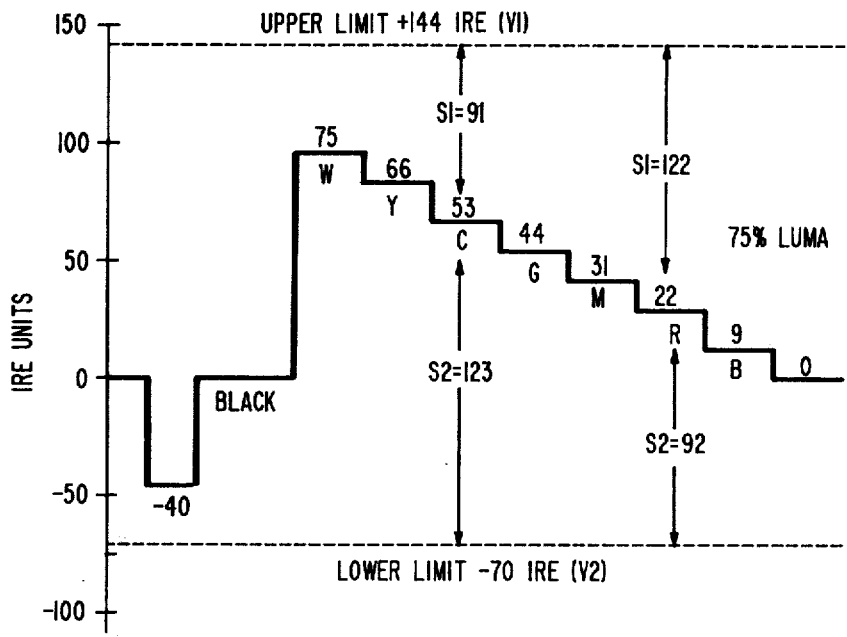
Figure 3:
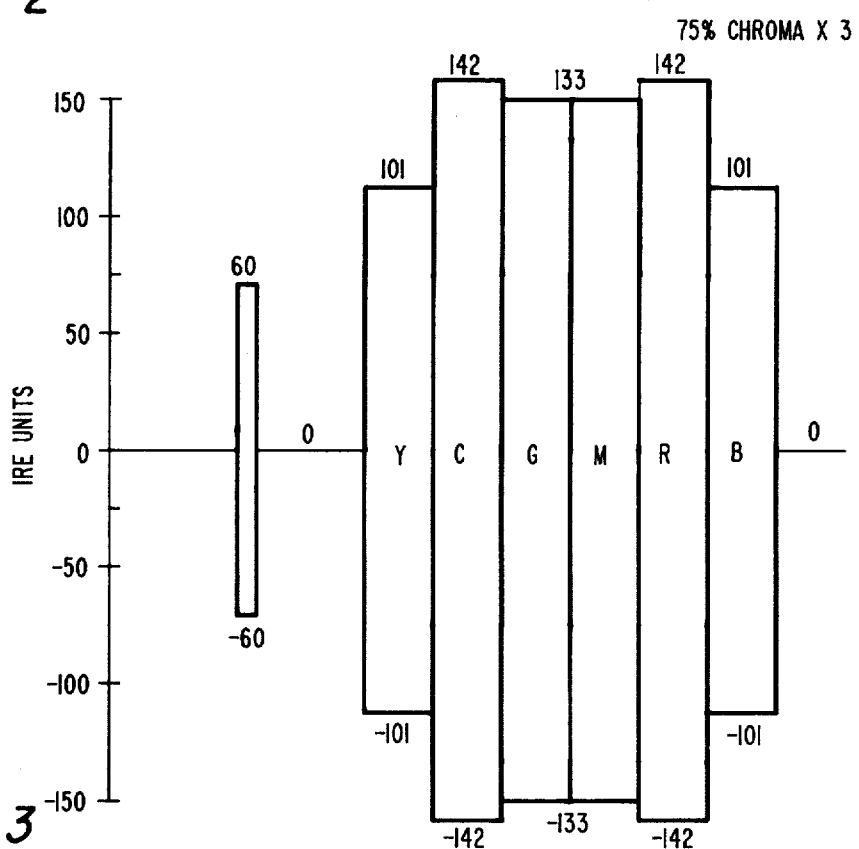

FIGS. 2 and 3 illustrate the waveform of the luminance signal produced by filter 12 and the chrominance signal produced at the output of amplifier 40, respectively, for the assumed conditions (for ease of illustration, the luminance signal is shown without preemphasis). As seen from FIG. 2, the luminance signal varies between −40 IRE units during the sync tip interval to 75 IRE units duirng the white (W) bar interval. The luminance levels for yellow (Y), cyan (C), green (G), magenta (M), red (R), and blue (B) are 66, 53, 44, 31, 22, and 9 IRE units, respectively. In FIG. 3, the 75% saturated and times three amplified chrominance signal is seen to be symmetrical about the zero IRE unit axis and has peak values for burst and the six color bars Y, C, G, M, R, and B of 60, 101, 142, 133, 133, 142, 101 IRE units, respectively.

Figure 4:
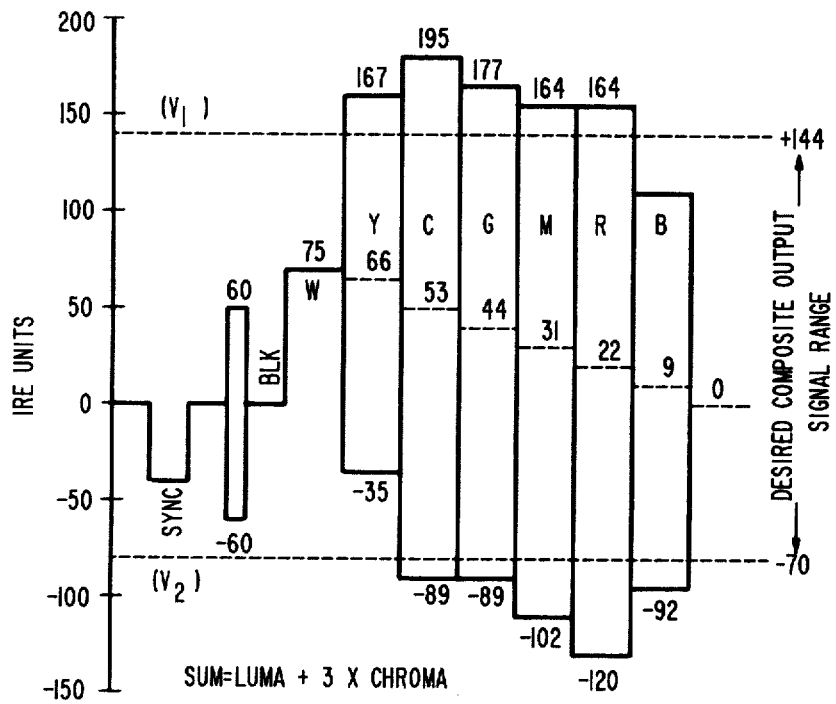

FIG. 4 illustrates the undesirable effect which would result if the waveforms of FIGS. 2 and 3 were combined and applied to a conventional fixed level limiter or clipper circuit having limiting levels of +144 and −70 IRE units. The cyan color bar, for example, having peaks of 195 and −89 IRE units, if clipped at 144 and −70 IRE units would have an average value of 37 IRE units. That value differs from the value of the luminance signal (53 units) by 16 units and thus the cyan color bar would not be symmetrical with respect to the luminance signal level. An effect of such asymmetry is creation of even order harmonic distortion products. For the specific example given, all of the color bars, if clipped at levels of 144 and −70 IRE units will exhibit asymmetry with respect to the luminance signal level.

Figure 5:
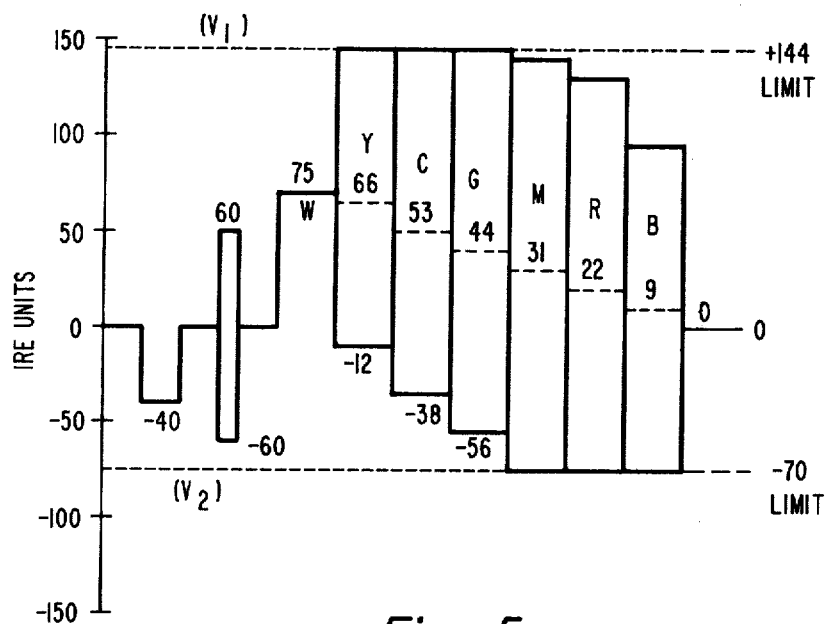

Referring again to FIG. 2, it is seen that for the color cyan, the signal S1 equals 91 units and is less than S2 which equals 123 units. The greatest peak to peak value the chrominance signal can assume is therefore ±91 units relative to the luminance level (53 units) to avoid asymmetrical limiting. In chrominance signal limiter 50, detectors 74 and 75 bias diodes D1 and D2 to turn on when the chrominance signal exceeds 91 IRE units in either sense (positive or negative) thereby limiting the chrominance signal amplitude to ±91 IRE units so that the sum of the luminance and chrominance signals for the color cyan is limited to 144 units and the chrominance component is symmetrically limited with respect to the luminance level (53 units) as shown in FIG. 5.

FIG. 2 also illustrates the permissible limits of the red color bar where it is seen that the signal S2 (92 units) is smaller than S1 (122 units). For this condition, the maximum chrominance signal amplitude is ±92 units to avoid exceeding the lower limit of −70 units and retain symmetry with respect to the luminance signal level (22 units). Accordingly, for this case, detectors 76 and 77 bias diodes D3 and D4 to limit the chrominance signal to ±92 units for the red color bar.

From the foregoing, it is apparent that by limiting excursions in either sense of the chrominance signal to the smaller of the signals S1 and S2 which represent the difference between the luminance signal and the desired upper and desired lower limiting levels, that: (1) the average value of the composite output signal for each color bar will equal the level of the luminance signal component; and (2) the peak amplitude of the composite video signal can never exceed the illustrative limiting values of +144 and −70 IRE units. Thus, even though each of the color bars is reduced in saturation level, the reduction is symmetrical with respect to the luminance signal level and is by an amount that confines excursions of the composite video output signal to the desired limiting range. Advantageously, each limit of the range may be independently controlled without affecting the other limit by appropriate selection of the voltages V1 and V2 applied to terminals 24 and 28, respectively.

What is claimed is:

1. A limiter for a composite video signal, comprising:
 filter means for separating said composite video signal into two components comprising a luminance signal and a chrominance signal;
 first limiter means for limiting said luminance signal to a range of values defined by first and second reference signals to provide a limited luminance signal;
 circuit means for producing a first control signal having a magnitude proportional to a potential difference between said limited luminance signal and said first reference signal and for producing a second control signal having a magnitude proportional to a potential difference between said limited luminance signal and said second reference signal;

second limiter means for limiting excursions in either sense of said chrominance signal to the lesser of said control signals to provide a symmetrically limited chrominance signal; and output means for combining said limited luminance signal and said limited chrominance signal to provide a composite video output signal limited to a range defined by said reference signals and in which the chrominance component thereof is symmetrically limited with respect to the level of the luminance component thereof.

2. A limiter for a composite video signal as recited in claim 1 wherein said second limiter means comprises means for forming a third control signal which varies inversely with variations of said first control signal and means for forming a fourth control signal which varies inversely with variations of said second control signal and means for limiting excursions in a first sense of said chrominance signal in accordance with the lesser in said first sense of said first and second control signals and means for limiting excursions in a second sense of said chrominance signal in accordance with the lesser, in said second sense, of said third and fourth control signals.

3. A limiter for a composite video signal as recited in claim 1 further comprising preemphasis circuit means interposed in a path between said filter means and said first limiter means.

4. A limiter for a composite video signal as recited in claim 1 further comprising amplifier means interposed in a path between said filter means and said second limiter means.

5. A limiter for a composite video signal as recited in claim 1 further comprising delay means interposed in a path including said first limiter means.

6. A limiter for a composite video signal, comprising:
filter means for separating a composite video input signal into a chrominance signal component and a luminance signal component;

means responsive to said luminance signal component for producing a first control signal V1-L, a second control signal L-V2, a third control signal L-V1, and a fourth control signal V2-L wherein L is a signal proportional to said luminance signal component and V1 and V2 are predetermined voltages;

means for limiting excursions in a first sense of said chrominance component to the lesser in said first sense of said first and second control signals and for limiting excursions in a second sense of said chrominance signal component to the lesser in said second sense of said third and fourth control signals to thereby provide a symmetrically limited chrominance signal; and means for combining said symmetrically limited chrominance component with said luminance component to provide a composite video output signal.

7. A limiter for a composite video signal as recited in claim 6 further comprising means for limiting said luminance signal component to a range of values defined by said predetermined voltages V1 and V2.

8. A limiter for a composite video signal as recited in claim 7 further comprising preemphasis circuit means and signal delay means interposed in a path including said means for limiting said luminance signal component.

* * * * *